(12) United States Patent
Jayaramachar

(10) Patent No.: US 12,483,608 B2
(45) Date of Patent: Nov. 25, 2025

(54) APPARATUS, METHOD AND COMPUTER PROGRAM FOR CALL SESSION CONTROL FUNCTION RESTORATION

(71) Applicant: NOKIA TECHNOLOGIES OY, Espoo (FI)

(72) Inventor: Amarnath Jayaramachar, Bengaluru (IN)

(73) Assignee: NOKIA TECHNOLOGIES OY, Espoo (FI)

( * ) Notice: Subject to any disclaimer, the term of this patent is extended or adjusted under 35 U.S.C. 154(b) by 180 days.

(21) Appl. No.: 17/284,546

(22) PCT Filed: Oct. 12, 2018

(86) PCT No.: PCT/EP2018/077900
§ 371 (c)(1),
(2) Date: Apr. 12, 2021

(87) PCT Pub. No.: WO2020/074098
PCT Pub. Date: Apr. 16, 2020

(65) Prior Publication Data
US 2021/0314372 A1    Oct. 7, 2021

(51) Int. Cl.
*H04L 65/1073* (2022.01)
*H04L 65/1016* (2022.01)
(Continued)

(52) U.S. Cl.
CPC ...... *H04L 65/1073* (2013.01); *H04L 65/1016* (2013.01); *H04L 65/1063* (2013.01); *H04L 65/1104* (2022.05)

(58) Field of Classification Search
CPC ............. H04L 65/1073; H04L 65/1006; H04L 65/1016; H04L 65/1063; H04L 67/14;
(Continued)

(56) References Cited

U.S. PATENT DOCUMENTS

2008/0176538 A1    7/2008    Terrill et al.
2010/0039930 A1*   2/2010    Liang ............... H04L 67/306
                                                370/216
(Continued)

FOREIGN PATENT DOCUMENTS

CN    101127722 A    2/2008
CN    102934415 A    2/2013
EP    2 400 715 A1   12/2011

OTHER PUBLICATIONS

"3rd Generation Partnership Project; Technical Specification Group Core Network and Terminals; Cx and Dx interfaces based on the Diameter protocol; Protocol details (Release 15)", 3GPP TS 29.229 v15.0.0, (Jun. 2018), 41 pages.
(Continued)

*Primary Examiner* — Taylor A Elfervig
(74) *Attorney, Agent, or Firm* — ALSTON & BIRD LLP

(57) ABSTRACT

There is disclosed an apparatus. The apparatus comprises means for performing: initiating restoration of the apparatus after a restart of the apparatus, the initiating restoration being in response to receipt of a session initiation message at the apparatus; sending a request to a home subscriber server for a service profile of a user equipment from which the session initiation message originated, the request comprising a wildcard public identity of the user equipment; and completing restoration of the apparatus using service profile information received from the home subscriber server in response to the request.

20 Claims, 8 Drawing Sheets

(51) Int. Cl.
H04L 65/1063 (2022.01)
H04L 65/1104 (2022.01)

(58) Field of Classification Search
CPC ............. H04L 61/3095; H04L 65/1053; H04L 29/12188; H04L 61/1588; H04L 29/12594; H04L 67/10; H04L 65/1069; H04L 47/70; H04L 41/5054; H04L 67/16; H04L 61/3045; H04L 29/12773; H04L 29/12905; H04W 8/26; H04W 4/02; H04W 84/16; H04W 8/04; H04W 76/12; H04W 8/20; H04M 15/57; H04M 7/009; H04M 3/42323; H04M 7/123; H04M 3/42314; H04M 3/42068; H04M 15/63; H04M 2215/208
USPC ......................................................... 709/224
See application file for complete search history.

(56) References Cited

U.S. PATENT DOCUMENTS

| | | | | |
|---|---|---|---|---|
| 2011/0213896 | A1* | 9/2011 | Merino Vazquez | ........................ H04L 65/1016 709/245 |
| 2011/0310889 | A1* | 12/2011 | Merino Vazquez | ........................ H04L 65/1069 370/352 |
| 2012/0011273 | A1* | 1/2012 | Van Elburg | ........... H04L 67/306 709/238 |
| 2012/0203879 | A1* | 8/2012 | Merino Vazquez | ........................ H04L 65/1016 709/223 |
| 2012/0227084 | A1* | 9/2012 | Shen | ................... H04L 65/1073 726/2 |
| 2013/0091546 | A1* | 4/2013 | Shen | ................... H04L 65/1016 726/3 |
| 2015/0063345 | A1* | 3/2015 | Hanstrom | ........... H04L 65/1063 370/352 |
| 2015/0249690 | A1* | 9/2015 | Merino Vazquez | ........................ H04L 65/1016 370/328 |
| 2017/0126747 | A1* | 5/2017 | Merino Vazquez | ........................ H04L 65/1046 |

OTHER PUBLICATIONS

"3rd Generation Partnership Project; Technical Specification Group Core Network and Terminals; IMS Restoration Procedures (Release 15)", 3GPP TS 23.380 v15.0.0 (Jun. 2018), 54 pages.

"3rd Generation Partnership Project; Technical Specification Group Core Network and Terminals; IP Multimedia (IM) Subsystem Cx and Dx interfaces; Signalling flows and message contents (Release 15)", 3GPP TS 29.228 v15.1.0 (Sep. 2018), 82 pages.

"3rd Generation Partnership Project; Technical Specification Group Core Network and Terminals; IP multimedia call control protocol based on Session Initiation Protocol (SIP) and Session Description Protocol (SDP); Stage 3 (Release 15)", 3GPP TS 24.229 v15.4.0, (Sep. 2018), 1039 pages.

"3rd Generation Partnership Project; Technical Specification Group Services and System Aspects; IP Multimedia Subsystem (IMS); Stage 2 (Release 15)", 3GPP TS 23.228 v15.3.0 (Sep. 2018), 330 pages.

International Search Report and Written Opinion for International Application No. PCT/EP2018/077900 dated Mar. 6, 2019, 14 pages.

First Examination Request for Indian Application No. 202147021254 dated Feb. 23, 2022, 7 pages.

Office Action for Chinese Application No. 201880100115.4 dated Sep. 27, 2022, 28 pages.

* cited by examiner

US 12,483,608 B2

APPARATUS, METHOD AND COMPUTER PROGRAM FOR CALL SESSION CONTROL FUNCTION RESTORATION

CROSS-REFERENCE TO RELATED APPLICATIONS

This application is a national phase entry of International Application No. PCT/EP2018/077900, filed Oct. 12, 2018, the entire contents of which are incorporated herein by reference.

FIELD

This disclosure relates to communications, and more particularly to an apparatus, method and computer program in a wireless communication system. More particularly the present disclosure relates to call session control function restoration.

BACKGROUND

A communication system can be seen as a facility that enables communication between two or more devices such as user terminals, machine-like terminals, base stations and/or other nodes by providing communication channels for carrying information between the communicating devices. A communication system can be provided for example by means of a communication network and one or more compatible communication devices.

A communication system may comprise, for example, an internet protocol multimedia subsystem (IMS).

STATEMENT OF INVENTION

According to a first aspect there is provided an apparatus comprising means for performing: initiating restoration of the apparatus after a restart of the apparatus, the initiating restoration being in response to receipt of a session initiation message at the apparatus; sending a request to a home subscriber server for a service profile of a user equipment from which the session initiation message originated, the request comprising a wildcard public identity of the user equipment; and completing restoration of the apparatus using service profile information received from the home subscriber server in response to the request.

According to an example, the means are further configured to perform receiving the wildcard public identity from the home subscriber server prior to sending the request to the home subscriber server with the wildcard public identity.

According to an example, the service profile information received from the home subscriber server being associated with an implicit registration set having a distinct public identity and the wildcard public identity, a value of the distinct public identity falling within a range of values of the wildcard public identity.

According to an example the service profile information comprises the implicit registration set.

According to an example, the service profile information received from the home subscriber server being associated with a service profile comprising a first service profile associated with the distinct public identity and a second service profile associated with the wildcard public identity, the first and second service profiles being different.

According to some examples the service profile information comprises the service profile.

According to an example, the means are further configured to perform sending the request to the home subscriber server for the service profile information in response to a server assignment answer message received from the home subscriber server, the server assignment answer message comprising the wildcard public identity.

According to an example, the wildcard public identity comprises an attribute value pair.

According to an example, the means are further configured to use the wildcard public identity to determine whether the restoration comprises an originating restoration or a terminating restoration According to an example, the means are further configured to perform selecting correct service profile information to send to an application server, based on the determination of whether the restoration is an originating restoration or a terminating restoration.

According to an example, the correct service profile information comprises a correct P-Profile-Key Private Header.

According to an example, the means are further configured to send the wildcard public identity of the user equipment to the application server. According to an example the means are configured to send the wildcard public identity to the application server along with the P-Profile-Key Private Header.

According to an example, the means are further configured to use the service profile information to obtain a service profile of the user equipment after restoration of the apparatus.

According to an example, the apparatus comprises a serving call session control function.

According to an example, the means comprises at least one processor; and at least one memory including computer program code, the at least one memory and computer program code configured to, with the at least one processor, cause the performance of the apparatus.

According to a second aspect there is provided an apparatus comprising at least one processor; and at least one memory including computer program code; the at least one memory and the computer program code configured to, with the at least one processor, cause the apparatus at least to perform: initiating restoration of the apparatus after a restart of the apparatus, the initiating restoration being in response to receipt of a session initiation message at the apparatus; sending a request to a home subscriber server for a service profile of a user equipment from which the session initiation message originated, the request comprising a wildcard public identity of the user equipment; and completing restoration of the apparatus using service profile information received from the home subscriber server in response to the request.

According to an example, the at least one memory and the computer program code configured to, with the at least one processor, cause the apparatus at least to perform receiving the wildcard public identity from the home subscriber server prior to sending the request to the home subscriber server with the wildcard public identity.

According to an example, the service profile information received from the home subscriber server being associated with an implicit registration set having a distinct public identity and the wildcard public identity, a value of the distinct public identity falling within a range of values of the wildcard public identity.

According to an example the service profile information comprises the implicit registration set.

According to an example, the service profile information received from the home subscriber server being associated with a service profile comprising a first service profile associated with the distinct public identity and a second service profile associated with the wildcard public identity, the first and second service profiles being different.

According to an example the service profile information comprises the service profile.

According to an example, the at least one memory and the computer program code configured to, with the at least one processor, cause the apparatus at least to perform sending the request to the home subscriber server for the service profile information in response to a server assignment answer message received from the home subscriber server, the server assignment answer message comprising the wildcard public identity.

According to an example, the wildcard public identity comprises an attribute value pair.

According to an example, the at least one memory and the computer program code configured to, with the at least one processor, cause the apparatus at least to use the wildcard public identity to determine whether the restoration comprises an originating restoration or a terminating restoration.

According to an example, the at least one memory and the computer program code configured to, with the at least one processor, cause the apparatus at least to perform selecting correct service profile information to send to an application server, based on the determination of whether the restoration is an originating restoration or a terminating restoration.

According to an example, the correct service profile information comprises a correct P-Profile-Key Private Header.

According to an example, the at least one memory and the computer program code configured to, with the at least one processor, cause the apparatus at least to send the wildcard public identity of the user equipment to the application server.

According to an example the at least one memory and the computer program code configured to, with the at least one processor, cause the apparatus at least to send the wildcard public identity to the application server along with the P-Profile-Key Private Header.

According to an example, the at least one memory and the computer program code configured to, with the at least one processor, cause the apparatus at least to use the service profile information to obtain a service profile of the user equipment after restoration of the apparatus.

According to an example, the apparatus comprises a serving call session control function.

According to a third aspect there is provided an apparatus comprising: initiating circuitry for initiating restoration of the apparatus after a restart of the apparatus, the initiating restoration being in response to receipt of a session initiation message at the apparatus; sending circuitry for sending a request to a home subscriber server for a service profile of a user equipment from which the session initiation message originated, the request comprising a wildcard public identity of the user equipment; and restoration circuitry for completing restoration of the apparatus using service profile information received from the home subscriber server in response to the request.

According to a fourth aspect there is provided a method comprising: initiating restoration of an apparatus after a restart of the apparatus, the initiating restoration being in response to receipt of a session initiation message at the apparatus; sending a request to a home subscriber server for a service profile of a user equipment from which the session initiation message originated, the request comprising a wildcard public identity of the user equipment; and completing restoration of the apparatus using service profile information received from the home subscriber server in response to the request.

According to an example, the method comprises receiving the wildcard public identity from the home subscriber server prior to sending the request to the home subscriber server with the wildcard public identity.

According to an example, the service profile information received from the home subscriber server being associated with an implicit registration set having a distinct public identity and the wildcard public identity, a value of the distinct public identity falling within a range of values of the wildcard public identity.

According to an example the service profile information comprises the implicit registration set.

According to an example, the service profile information received from the home subscriber server being associated with a service profile comprising a first service profile associated with the distinct public identity and a second service profile associated with the wildcard public identity, the first and second service profiles being different.

According to an example, the service profile information comprises the service profile.

According to an example, the method comprises sending the request to the home subscriber server for the service profile information in response to a server assignment answer message received from the home subscriber server, the server assignment answer message comprising the wildcard public identity.

According to an example, the wildcard public identity comprises an attribute value pair.

According to an example, the method comprises using the wildcard public identity to determine whether the restoration comprises an originating restoration or a terminating restoration.

According to an example, the method comprises selecting correct service profile information to send to an application server, based on the determination of whether the restoration is an originating restoration or a terminating restoration.

According to an example, the correct service profile information comprises a correct P-Profile-Key Private Header.

According to an example, the method comprises sending the wildcard public identity of the user equipment to the application server. According to an example the method comprises sending the wildcard public identity to the application server along with the P-Profile-Key Private Header.

According to an example, the method comprises using the service profile information to obtain a service profile of the user equipment after restoration of the apparatus.

According to an example, the apparatus comprises a serving call session control function.

According to a fifth aspect, there is provided a computer program comprising instructions for causing an apparatus to perform at least the following: initiating restoration of the apparatus after a restart of the apparatus, the initiating restoration being in response to receipt of a session initiation message at the apparatus; sending a request to a home subscriber server for a service profile of a user equipment from which the session initiation message originated, the request comprising a wildcard public identity of the user equipment; and completing restoration of the apparatus using service profile information received from the home subscriber server in response to the request.

According to a sixth aspect, there is provided a computer program comprising instructions stored thereon for performing at least the following: initiating restoration of an apparatus after a restart of the apparatus, the initiating restoration being in response to receipt of a session initiation message at the apparatus; sending a request to a home subscriber server for a service profile of a user equipment from which the session initiation message originated, the request comprising a wildcard public identity of the user equipment; and completing restoration of the apparatus using service profile information received from the home subscriber server in response to the request.

According to a seventh aspect, there is provided a non-transitory computer readable medium comprising program instructions for causing an apparatus to perform at least the following: initiating restoration of the apparatus after a restart of the apparatus, the initiating restoration being in response to receipt of a session initiation message at the apparatus; sending a request to a home subscriber server for a service profile of a user equipment from which the session initiation message originated, the request comprising a wildcard public identity of the user equipment; and completing restoration of the apparatus using service profile information received from the home subscriber server in response to the request.

According to an eighth aspect, there is provided a non-transitory computer readable medium comprising program instructions stored thereon for performing at least the following: initiating restoration of the apparatus after a restart of the apparatus, the initiating restoration being in response to receipt of a session initiation message at the apparatus; sending a request to a home subscriber server for a service profile of a user equipment from which the session initiation message originated, the request comprising a wildcard public identity of the user equipment; and completing restoration of the apparatus using service profile information received from the home subscriber server in response to the request.

According to a ninth aspect there is provided an apparatus comprising means for performing: receiving a request for service profile information of a user equipment, the request received from a serving call session control function undergoing restoration following a restart of the call session control function; and in response to the request, sending a wildcard public identity of the user equipment to the call session control function.

According to an example, the service profile information being associated with an implicit registration set having a distinct public identity and the wildcard public identity, a value of the distinct public identity falling within a range of values of the wildcard public identity.

According to an example the service profile information comprises the implicit registration set.

According to an example, the service profile information being associated with a service profile comprising a first service profile associated with the distinct public identity and a second service profile associated with the wildcard public identity, the first and second service profiles being different.

According to an example the service profile information comprises the service profile.

According to an example, the means are further configured to perform sending the wildcard public identity in a server assignment answer message.

According to an example, the wildcard public identity comprises an attribute value pair.

According to an example, the apparatus comprises a home subscriber server.

According to an example, the means comprises at least one processor; and at least one memory including computer program code, the at least one memory and computer program code configured to, with the at least one processor, cause the performance of the apparatus.

According to a tenth aspect there is provided an apparatus comprising at least one processor; and at least one memory including computer program code; the at least one memory and the computer program code configured to, with the at least one processor, cause the apparatus at least to perform: receiving a request for service profile information of a user equipment, the request received from a serving call session control function undergoing restoration following a restart of the call session control function; and in response to the request, sending a wildcard public identity of the user equipment to the call session control function.

According to an example, the service profile information being associated with an implicit registration set having a distinct public identity and the wildcard public identity, a value of the distinct public identity falling within a range of values of the wildcard public identity.

According to an example the service profile information comprises the implicit registration set.

According to an example, the service profile information being associated with a service profile comprising a first service profile associated with the distinct public identity and a second service profile associated with the wildcard public identity, the first and second service profiles being different.

According to an example the service profile information comprises the service profile.

According to an example, the at least one memory and the computer program code configured to, with the at least one processor, cause the apparatus at least to send the wildcard public identity in a server assignment answer message.

According to an example, the wildcard public identity comprises an attribute value pair.

According to an example, the apparatus comprises a home subscriber server.

According to an eleventh aspect there is provided an apparatus comprising: receiving circuitry for receiving a request for service profile information of a user equipment, the request received from a serving call session control function undergoing restoration following a restart of the call session control function; and sending circuitry for, in response to the request, sending a wildcard public identity of the user equipment to the call session control function.

According to a twelfth aspect there is provided a method comprising: receiving a request for service profile information of a user equipment, the request received from a serving call session control function undergoing restoration following a restart of the call session control function; and in response to the request, sending a wildcard public identity of the user equipment to the call session control function.

According to an example, the service profile information being associated with an implicit registration set having a distinct public identity and the wildcard public identity, a value of the distinct public identity falling within a range of values of the wildcard public identity.

According to an example the service profile information comprises the implicit registration set.

According to an example, the service profile information being associated with a service profile comprising a first service profile associated with the distinct public identity and a second service profile associated with the wildcard public identity, the first and second service profiles being different.

According to an example, the service profile information comprises the service profile.

According to an example, the method comprises sending the wildcard public identity in a server assignment answer message.

According to an example, the wildcard public identity comprises an attribute value pair.

According to an example, the apparatus comprises a home subscriber server.

According to a thirteenth example, there is provided a computer program comprising instructions for causing an apparatus to perform at least the following: receiving a request for service profile information of a user equipment, the request received from a serving call session control function undergoing restoration following a restart of the call session control function; and in response to the request, sending a wildcard public identity of the user equipment to the call session control function.

According to a fourteenth example, there is provided a computer program comprising instructions stored thereon for performing at least the following: receiving a request for service profile information of a user equipment, the request received from a serving call session control function undergoing restoration following a restart of the call session control function; and in response to the request, sending a wildcard public identity of the user equipment to the call session control function.

According to a fifteenth example there is provided a non-transitory computer readable medium comprising program instructions for causing an apparatus to perform at least the following: receiving a request for service profile information of a user equipment, the request received from a serving call session control function undergoing restoration following a restart of the call session control function; and in response to the request, sending a wildcard public identity of the user equipment to the call session control function.

According to a sixteenth example there is provided a non-transitory computer readable medium comprising program instructions stored thereon for performing at least the following: receiving a request for service profile information of a user equipment, the request received from a serving call session control function undergoing restoration following a restart of the call session control function; and in response to the request, sending a wildcard public identity of the user equipment to the call session control function.

BRIEF DESCRIPTION OF FIGURES

The invention will now be described in further detail, by way of example only, with reference to the following examples and accompanying drawings, in which.

DETAILED DESCRIPTION

Figure 1:
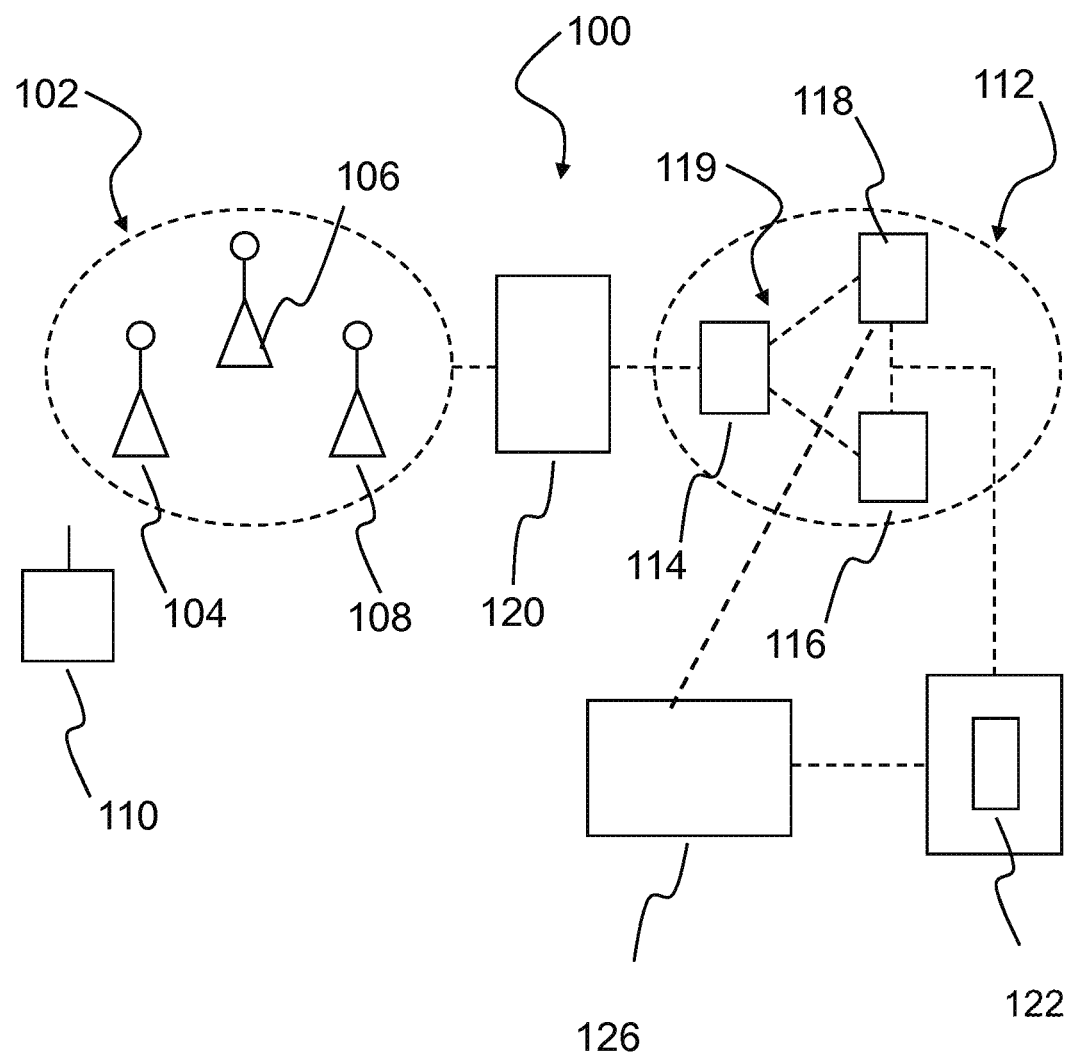
FIG. 1 shows a schematic example of some aspects of a wireless communication system where the invention may be implemented.

FIG. 1 shows a vastly simplified example of a communication system 100 in which the invention may take place. The system 100 comprises an access network shown schematically at 102. The access network 102 may for example comprise or be comprised in a 3G network, a 4G network, a 4G LTE network, a 5G network etc. The access network 102 comprises one or more base stations 104, 106, 108. The base stations may for example comprise eNBs. A user equipment (UE) is shown schematically at 110. The one or more base stations enable the UE 110 to communicate with one or more other UEs and/or other elements within the system 100.

The access network 102 is in communication with IP multimedia subsystem (IMS) 112. The IMS 112 is configured for delivering IP multimedia services, for example to UE 110 via access network 102. In this example the IMS comprises a proxy-call session control function (P-CSCF) 114, an interrogating call session control function (I-CSCF) 116, and a serving-call session control function (S-CSCF) 118. The P-CSCF, I-CSCF and S-CSCF may collectively be referred to as call state control function or call session control function (CSCF) 119.

The IMS 112 is linked to the access network 102 via a policy charging and rules function (PCRF) 120.

One or more databases is shown schematically at 122. In this example the one or more databases 122 comprises a home subscriber server (HSS) 124. The HSS may be considered a master user database that supports the IMS network entities that handle calls or sessions. The HSS 124 contains subscription-related information such as subscriber profiles. The HSS 124 also performs authentication and authorization of UEs, and can provide information about a subscriber's location and IP information. The one or more databases 122 (e.g. HSS 124) may in some examples be considered part of the IMS 112.

In the example of FIG. 1, the HSS 124 is in communication with an application server (AS) 126. The AS 126 is also in communication with S-CSCF 118.

In 3GPP, IMS registration is triggered by a UE and is performed by the IMS core network elements. For example the CSCF 119 and HSS 124 may be the core network elements that are involved in the IMS registrations. As part of the registration procedure, S-CSCF 118 updates its address in the HSS 124, and downloads the service-profile for that subscriber (e.g. the UE that triggered the registration) that is provisioned in the HSS 124. S-CSCF 118 also performs the third-party registration on behalf of UE 110. IMS core network supports registered and unregistered services to the IMS and non-IMS subscriber based on the subscription. The subscriber data may be stored in a backend database, and the operator manages the user subscription through the front end HSS 124, where the operator is enabled to access and modify the subscriber profile and service-profile. Based on the modification of the subscriber profile, HSS 124 interacts with CSCF 119 (e.g. on a Cx interface) for any further activity. The Cx interface may be considered a Diameter protocol interface.

As per 3GPP standard 23.380, SCSCF restoration may be required due to SCSF failure, and restart is discussed. Restoration may be required where the S-CSCF has lost UE registration data for some reason. In such situations the HSS 124 sends the stored restoration information for the SCSCF 118 to restore the lost registrations data for a given IP multimedia public identity (IMPU) or implicit registration set (IRS). The IMPU is used by a UE for requesting communications to any other UE. As per 3GPP 29.228 and 29.229, the diameter support for restoration is discussed along with the scenarios of wildcard IMPU defined in the IRS.

As per 3GPP 23.380, section 4.4, SCSCF 118 restoration originating at a UE 110 is discussed. For SCSCF 118 restart scenarios, a session initiation protocol (SIP) register and non-register request triggers the SCSCF 118 restoration. And, for SCSCF 118 failure scenarios, the P-CSCF 114 sends an error response for non-register requests for the UE 110 to re-register.

"Originating restoration" may be distinguished from "terminating restoration". Consider where there are two UEs, A and B. Say UE A attempts to connect to UE B (e.g. UE A calls UE B). If the S-CSCF cannot find the registration data for UE A (i.e. the calling party) then originating restoration is triggered. If the S-CSCF cannot find the registration data for UE B (i.e. the called party) then terminating restoration is triggered.

As per the specification 23.380 section 4.4, for a non-register request received at the SCSCF 118 that has lost all the registration data after a restart, the registration data can be restored from the HSS 124. The procedure is to send a server assignment request (SAR) with server assignment type (SAT) set to NO_ASSIGNMENT. The HSS 124 responds with the restoration data. If there is S-CSCF 118 restoration information stored in the HSS 124 (e.g. restoration information related to the Public User Identity), the HSS 124 shall send the S-CSCF 118 restoration information together with the user profile in the server assignment answer (SAA) to the S-CSCF.

Figure 2:
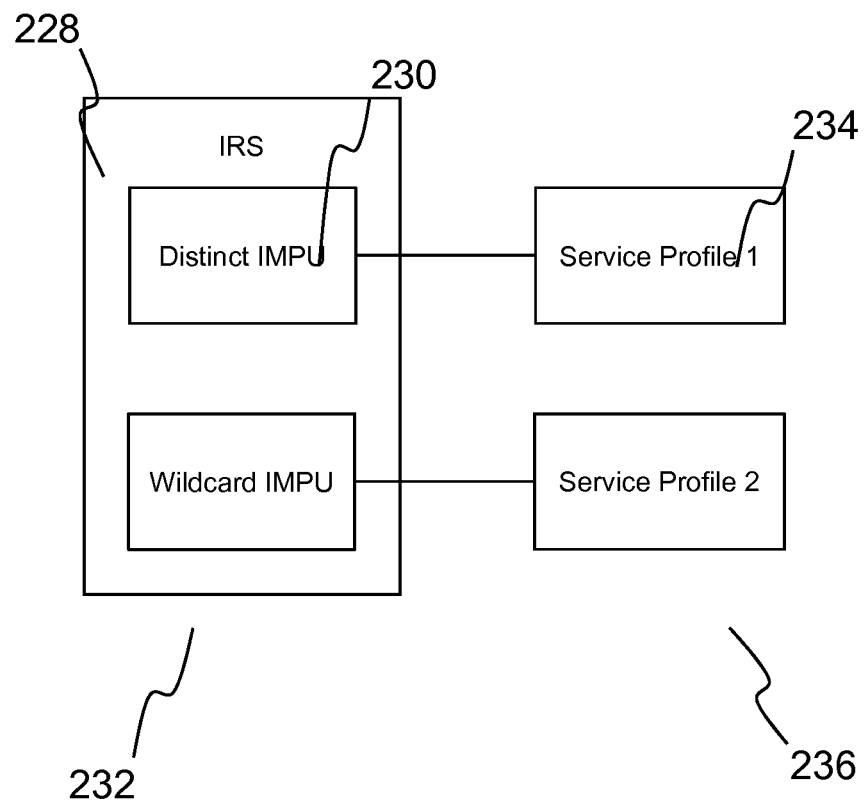
FIG. 2 shows an example implicit registration set and accompanying service profiles.

Referring to FIG. 2, an IRS 228 is defined with two IMPU entries: a "distinct" IMPU 230 and a "wildcard" or "wildcarded" IMPU 232. The distinct IMPU 230 is assigned to a user profile named Service-Profile 1 (SP1) 234 and the wildcard IMPU 232 is assigned to a user profile named Service-Profile 2 (SP2) 236. SP1 may be different to SP2. A problem occurs when the distinct IMPU 230 falls within the range of the wildcard IMPU 232. For example the values of the wildcard IMPU and the distinct IMPU may overlap, such as in the following example:

Wildcard IMPU: sip:+420241425941.*!@voiptest.cz
Distinct IMPU: sip:+420241425940@voiptest.cz A "wildcard" or "wildcarded" IMPU may be considered a group of public user identities which are implicitly registered together, and share a service profile. The wildcard IMPU is implicitly registered alongside at least one non-wildcard public identity (e.g. a distinct IMPU).

According to examples the IMS can support a wildcarded public user identity. For example a wildcarded IMPU concept has been introduced to cover a range/group of IMPUs to simplify administration efforts, and in some examples with the pre-condition that all IMPUs within a wildcarded IMPU are assigned to the same service profile. Furthermore, the distinct IMPU may be defined as a public user identity to identify an IMS user. Public user identities can be stored in the HSS as wildcarded public user identities. A wildcarded public user identity represents a collection of public user identities that share the same service profile and are included in the same implicit registration set. Wildcarded public user identities can enable optimisation of the operation and maintenance of the nodes for cases in which a large amount of users are registered together and handled in the same way by the network. A wildcarded public user identity expresses a set of public user identities grouped together. It shall be possible to include and express the wildcarded public user identity in the implicit registration set. An implicit registration of a wildcarded public user identity can be handled in the same manner as the implicit registration of a distinct public user identity from a network perspective, with only one service profile associated to the wildcarded public user identity. When the value of a public user identifier matches what is expressed as an implicitly registered wildcarded public user identity and there is no better match, then the procedures are the same as in the case that the identifier matches an implicitly registered distinct public user identity.

Wildcard analysis is a digit analysis in which the analysed digit sequence can end with a wildcard character. A wildcard character is a symbol that may be used to represent one or more characters.

By way of non-limiting example, a wildcarded IMPU is given in the following: All Tel-URIs begin with +123 for a company behind an IP private branch exchange (IP-PBX). Extended Regular Expression (ERE) can be used to define a wildcarded IMPU. Such a wildcarded IMPU can have the format of "tel:+123!.*!".

Figure 3:
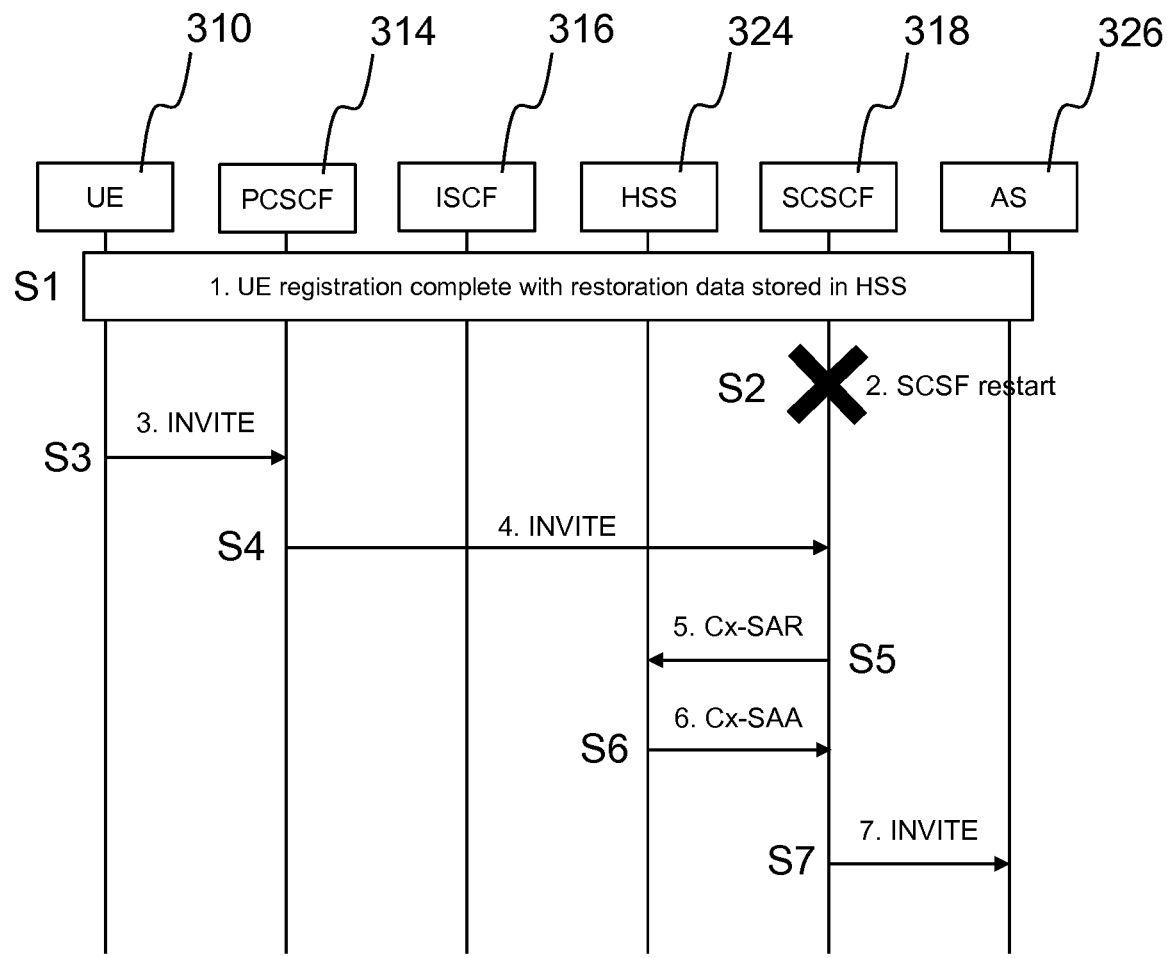
FIG. 3 shows a signalling diagram according to an example.

FIG. 3 shows a call flow for a UE 310 triggering restoration of an SCSCF 318, due to a SIP INVITE request.

At S1, registration of the UE 310 is complete and the restoration information is stored in the HSS 324.

At S2, the SCSCF 318 restarts and loses all of the registration data.

At S3, the UE 310 triggers an INVITE request.

At S4, the PCSCF 314 forwards the INVITE request to the SCSCF 318.

At S5, the SCSCF finds no registration data and consequently triggers the restoration, by triggering a Server Assignment Request (SAR). For example, the SAR may be in the form of a Cx-SAR. In an example, the Cx-SAR may be set with a value indicating that the SCSF 318 has no assigned registration data. For example the Cx-SAR may be set with a value SAT=NO_ASSIGNMENT.

At S6, the HSS 324 responds to the Cx-SAR with a server assignment answer (SAA), for example in the form of a Cx-SAA. The SAA comprises restoration details.

Presence of a wildcarded public identity AVP from the HSS in the restoration details determines wildcarded registration at S-CSCF after the restoration. For terminating restoration, the HSS sends the wildcarded-public-identity-AVP value. However, the wildcarded-public-identity-AVP value is not sent during originating restoration. Knowing the registration type (e.g. terminating or originating) is necessary to select the right service profile and include the P-profile-key header in the request towards AS.

At S7, the SCSCF may match the wrong service-profile (e.g. because it does not know the registration type) and the INVITE is forwarded from the SCSCF 318 to the AS 326 without a P-Profile-Key header. The P-Profile-Key header field is used in the IMS to provide SIP registrars and SIP proxy servers with the key of the profile corresponding to the destination SIP URI of a particular SIP request.

Since a distinct public identity falling into the range of a wildcard public identity can have a different service profile to the service profile of the wildcard public identity (i.e. SP1 can be different to SP2), the SCSCF 318 may not be able to identify the correct service profile.

Based on the 3GPP 29.228 specification, table 6.1.2.2, Wildcarded-Public-Identity attribute value pair (AVP) is sent in the response (e.g. the response at S5 in FIG. 3) if the SAT type was set to UNREGISTERED_USER. Hence, in the case of originating restoration due to a request from an unregistered user, the SCSCF 318 constructs a Cx-SAR with SAT=NO_ASSIGNMENT and doesn't receive any indication of a wildcard public identity. Based on the 3GPP 24.229 specification, section 5.4.3, P-Profile-Key header information is required for the SCSCF 318 to execute the right service profile, and a P-Profile-Key header shall be inserted by the SCSCF 318 before forwarding to the AS 326. That is, the INVITE message at S7 of FIG. 3 may be missing this P-Profile-Key header.

The specification for originating a restoration case where the distinct IMPU is in the range of the wildcard IMPU is not defined in the specification. Accordingly, the behaviour of the SCSCF 318 may be ambiguous and there may be problems with SCSCF 318 handling.

At least some examples of this disclosure deal with the scenario in which a first IP multimedia public identity value (e.g. distinct IMPU) falls within a range of a second IP multimedia public identity (e.g. wildcard IMPU) in an IRS, and SCSCF registration is triggered due to a request from a non-registered UE (e.g. SIP NON-REGISTER request), in a SCSCF restart case.

In such a scenario, the HSS sends an IMPU to the SCSCF. More particularly, the IMPU sent from the HSS to the SCSCF may comprise a wildcard IMPU AVP. The IMPU AVP may be sent as part of a SAA in response to a SAR from the SCSF, and more particularly may be sent as a Cx-SAA in response to a Cx-SAR from the SCSCF. This may be in response to restoration originating from the SCSCF, with SAT set to NO_ASSIGNMENT.

The HSS includes a wild-carded Public Identity AVP in response to the SCSF. In some examples, the wildcard Public Identity AVP is included when the Cx-SAR from the SCSCF comprises a particular entry. The particular entry may comprise a DIAMETER_ERROR_IN_ASSIGNMENT_TYPE Result-Code. Upon reception of this error code, the S-CSCF behaves as if it had received a wildarded public identity originally.

Subsequently, the S-CSCF includes the wild-carded AVP in the CxSAR request to download the service-profile.

The HSS then responds with restoration information. The S-CSCF may then trigger S-CSCF restoration. Following successful restoration, the correct service-profile may be executed. A header (e.g. P-Profile-Key) header is then inserted in to the request and forwarded to the AS.

Figure 4:
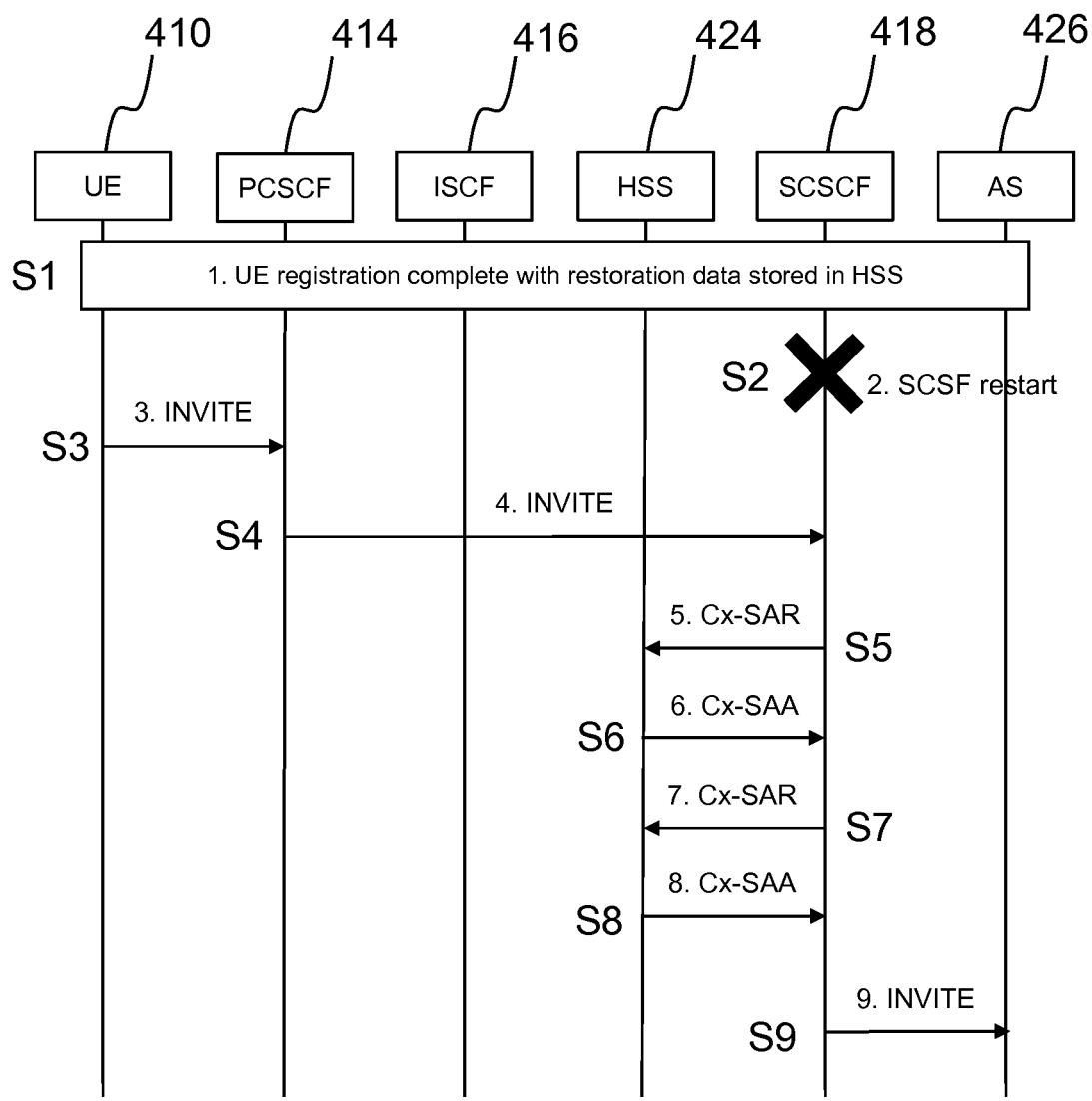
FIG. 4 shows a signalling diagram according to an example.

This is described in more detail with respect to FIG. 4.

As shown at S1, a UE registration has been completed, with UE restoration data stored in HSS 424. The example of FIG. 4 may be considered an originating restoration.

Subsequently, S-CSCF 418 fails. Accordingly S-CSCF 418 restarts itself, as shown at S2. This causes S-CSCF 418 to lose all of its registration data (e.g. to lose registration data pertaining to UE 410).

At S3, UE 410 sends an INVITE message to PCSCF 414. The INVITE sent by the UE at S3 may be independent of the SCSF failure i.e. the UE 410 may be unaware of the SCSF failure. The INVITE message may be considered a session initiation message, and may be considered to initiate restoration of the S-CSCF 418.

At S4, the PCSCF 414 forwards the INVITE message to the SCSCF 418.

The S-CSCF 418, having no registration data, triggers restoration of S-CSCF 418 by triggering Cx-SAR. This is shown at S5. The Cx-SAR is set with an indication of SAT=NO_ASSIGNMENT.

Thus, to this point, the steps of FIG. 4 are the same as in FIG. 3.

At S6, HSS 424 responds to the Cx-SAR by sending a Cx-SAA to S-CSCF 418, as shown at S6. The Cx-SAA is set with an error code which in this example is set to DIAMETER_ERROR_IN_ASSIGNMENT_TYPE, which is sent with a wildcarded Public-Identity AVP.

Then, on reception of the wild-carded-public identity information, S-CSCF 418 constructs a Cx-SAR including the wild-carded-public-identity AVP. This is shown at S7. That is it may be considered that a request is sent to the home subscriber server for service profile information of the UE 410, in response to a server assignment answer message received from the home subscriber server, the server assignment answer message comprising the wildcard public identity. The wildcard public identity in the SAR at S7 is the same as or based on the wildcard public identity included in the SAA of S6. The Cx-SAR sent at S7 may be considered a second SAR, with the Cx-SAR sent at S5 being considered a first SAR.

In response to this, the HSS responds with the restoration details for the S-CSCF. In this example the restoration details are sent as SAA, as shown at S8. The SAA at S8 may be considered a second SAA, with the SAA at S6 being considered a first SAA.

As shown at S9, the S-CSCF 418 then forwards the INVITE message to AS 426. The INVITE message sent at S9 may include the correct service profile for the UE 410. The INVITE message sent at S9 may also include a P-Profile-key header.

Accordingly the UE's INVITE message sent at S3 can be dealt with by the AS 426.

According to some examples, the S-CSF 418 and the AS 426 may each independently download the service profile for the UE 410 from the HSS 424.

It will therefore be understood that for situations where a distinct IMPU falls within the range of a wildcard IMPU in a same IRS following S-CSCF restart, the S-CSCF will behave as discussed above whereby the S-CSCF executes a correct service profile, and includes a P-Profile-Key header in the request towards the AS.

According to examples, the S-CSCF uses the wildcard public identity to determine whether it is a terminating restoration or an originating restoration. That is the S-CSCF can use the wildcard public identity to determine a restoration type. The S-CSCF can use the determined information of whether it is an originating restoration or a terminating restoration to determine the correct service profile information to be sent to the application server. The correct service profile information sent to the application server may comprise a correct P-Profile-Key Private Header. For example the S-CSCF can use the determination of restoration type to ensure that a correct profile header is sent in the INVITE request to the AS. This ensures that the correct service profile information is used in the IMS following S-CSCF restoration.

Figure 5:
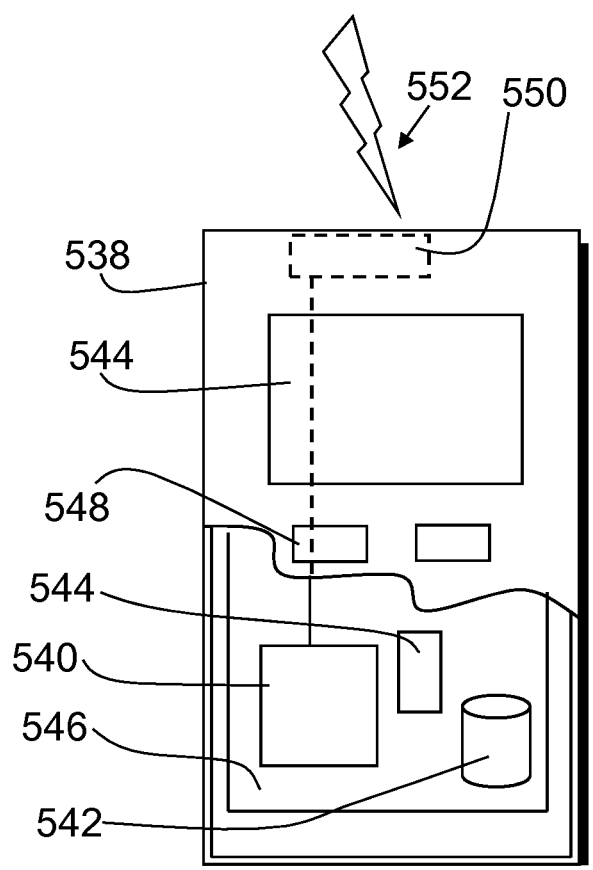
FIG. 5 shows an example of a communication device.

A possible wireless communication device will now be described in more detail with reference to FIG. 5 showing a schematic, partially sectioned view of a communication device 538. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 538 may receive signals over an air or radio interface 552 via appropriate apparatus for receiving and may transmit signals via appropriate apparatus for transmitting radio signals. In FIG. 5 transceiver apparatus is designated schematically by block 550. The transceiver apparatus 550 may be provided for example by means of a radio part and associated antenna arrangement. The antenna arrangement may be arranged internally or externally to the wireless device.

A wireless device is typically provided with at least one data processing entity 540, at least one memory 542 and other possible components 544 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 546. The user may control the operation of the wireless device by means of a suitable user interface such as key pad 548, voice commands, touch sensitive screen or pad, combinations thereof or the like. A display 544, a speaker and a microphone can be also provided. Furthermore, a wireless communication device may comprise appropriate connectors (either wired or wireless) to other devices and/or for connecting external accessories, for example hands-free equipment, thereto. The communication devices 542, 546, 548 may access the communication system based on various access techniques.

Figure 6:
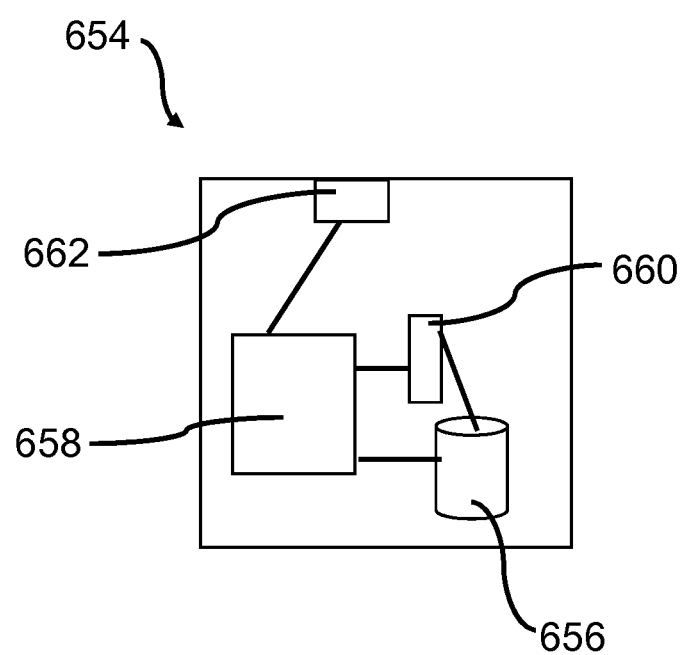
FIG. 6 shows an example of a control apparatus.

FIG. 6 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 654 can be arranged to provide control on communications in the service area of the system. The control apparatus 654 comprises at least one memory 656, at least one data processing unit 658, 660 and an input/output interface 662. Via the interface the control apparatus can be coupled to a receiver and a transmitter of the base station. The receiver and/or the transmitter may be implemented as a radio front end or a remote radio head. For example the control apparatus 654 or processor 540 can be configured to execute an appropriate software code to provide the control functions.

Figure 7:
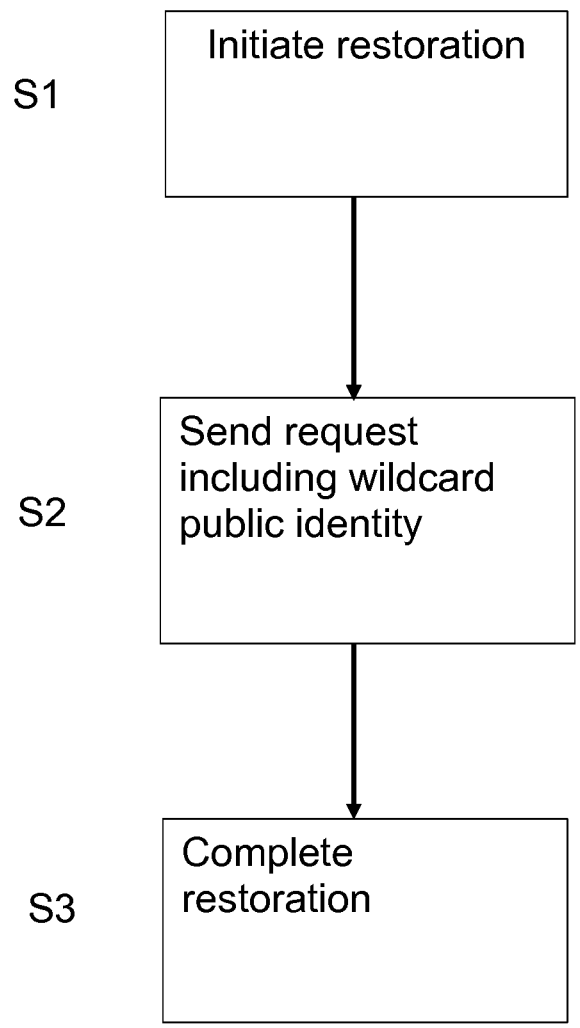
FIG. 7 is a flow chart of a method according to an example.

FIG. 7 is a flow chart of a method according to an example. The flow chart of FIG. 7 may be viewed from the perspective of an apparatus. For example the apparatus may comprise an S-CSCF.

At S1, the method comprises initiating restoration of an apparatus after a restart of the apparatus, the initiating restoration being in response to receipt of a session initiation message at the apparatus.

At S2, the method comprises sending a request to a home subscriber server for a service profile of a user equipment from which the session initiation message originated, the request comprising a wildcard public identity of the user equipment.

At S3, the method comprises completing restoration of the apparatus using service profile information received from the home subscriber server in response to the request.

Figure 8:
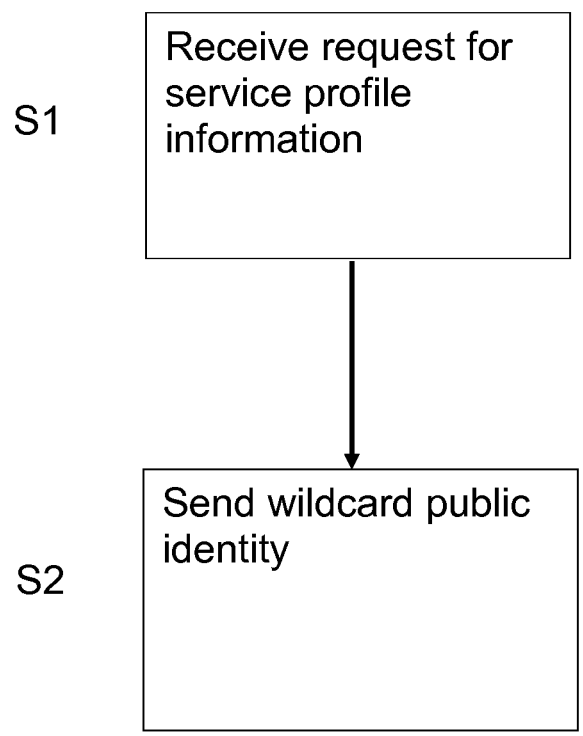
FIG. 8 is a flow chart of a method according to an example.

FIG. 8 is a flow chart of a method according to an example. The flow chart of FIG. 8 may be viewed from the perspective of an apparatus. For example the apparatus may comprise an HSS.

At S1, the method comprises receiving a request for service profile information of a user equipment, the request received from a serving call session control function undergoing restoration following a restart of the call session control function.

At S2 the method comprises, in response to the request, sending a wildcard public identity of the user equipment to the call session control function.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. An apparatus, comprising at least one processor, and at least one memory including computer program code, the at least one memory and computer program code configured to, with the at least one processor, cause the apparatus to perform:

initiating restoration of the apparatus after a restart of the apparatus, the initiating restoration being in response to receipt of a session initiation message at the apparatus, wherein initiating restoration of the apparatus comprises sending a server assignment request, comprising (i) an entry indicating an error result code and (ii) a server assignment type set to indicate that there is no assignment, to a home subscriber server;

receiving a server assignment answer message from the home subscriber server in response to the initiating restoration of the apparatus, the server assignment answer message comprising a wildcard public identity of a user equipment, responsive to the server assignment request comprising the server assignment type set to indicate that there is no assignment, from which the session initiation message originated;

sending a request to the home subscriber server for information associated with a service profile of the user equipment based on a restoration type in response to the received server assignment answer message, the request comprising the wildcard public identity, wherein the wildcard public identity comprises a group of user identities which are registered together and share the service profile; and completing restoration of the apparatus using the information associated with the service profile received from the home subscriber server in response to the request.

2. An apparatus according to claim 1, the information associated with the service profile received from the home subscriber server being associated with a service profile comprising a first service profile associated with the distinct public identity and a second service profile associated with the wildcard public identity, the first and second service profiles being different.

3. An apparatus according to claim 1, wherein the at least one memory and computer program code are further configured to, with the at least one processor, cause the apparatus to use the wildcard public identity to determine the restoration type by determining whether the restoration comprises an originating restoration or a terminating restoration.

4. An apparatus according to claim 3, wherein the at least one memory and computer program code are further configured to, with the at least one processor, cause the apparatus to perform selecting correct information associated with the service profile to send to an application server, based on the determination of whether the restoration is an originating restoration or a terminating restoration.

5. An apparatus according to claim 1, wherein the at least one memory and computer program code are further configured to, with the at least one processor, cause the apparatus to use the information associated with the service profile to obtain a service profile of the user equipment after restoration of the apparatus.

6. The apparatus according to claim 1, wherein the information associated with the service profile received from the home subscriber server is associated with an implicit registration set having a distinct public identity and the wildcard public identity, a value of the distinct public identity falling within a range of values of the wildcard public identity.

7. The apparatus according to claim 1, wherein the information associated with the service profile comprises a correct header.

8. The apparatus according to claim 7, wherein the header is a P-Profile-Key Private Header.

9. The apparatus according to claim 1, wherein the entry indicating the error result code comprises a DIAMETER_ERROR_IN_ASSIGNMENT_TYPE result code.

10. An apparatus, comprising at least one processor; and at least one memory including computer program code, the at least one memory and computer program code configured to, with the at least one processor, cause the apparatus to perform:
sending a server assignment answer message, in response to initiating restoration at a serving call session control function and receiving a server assignment request comprising (i) an entry indicating an error result code and (ii) a server assignment type set to indicate that there is no assignment, the serving call session control function undergoing restoration following a restart of the call session control function and the server assignment answer message comprising a wildcard public identity of a user equipment, responsive to the server assignment request comprising the server assignment type set to indicate that there is no assignment, from which a session initiation message originated;
receiving from the serving call session control function a request for information associated with a service profile of the user equipment based on a restoration type, the request comprising the wildcard public identity, wherein the wildcard public identity comprises a group of public user identities which are registered together and share the service profile; and
in response to the request, sending information associated with the service profile to the call session control function.

11. An apparatus according to claim 10, the information associated with the service profile being associated with a service profile comprising a first service profile associated with the distinct public identity and a second service profile associated with the wildcard public identity, the first and second service profiles being different.

12. A method comprising:
initiating restoration of an apparatus after a restart of the apparatus, the initiating restoration being in response to receipt of a session initiation message at the apparatus, wherein initiating restoration of the apparatus comprises sending a server assignment request, comprising (i) an entry indicating an error result code and (ii) a server assignment type set to indicate that there is no assignment, to a home subscriber server;
receiving a server assignment answer message from the home subscriber server in response to the initiating restoration of the apparatus, the server assignment answer message comprising a wildcard public identity of a user equipment, responsive to the server assignment request comprising the server assignment type set to indicate that there is no assignment, from which the session initiation message originated;
sending a request to the home subscriber server for information associated with a service profile of the user equipment based on a restoration type in response to the received server assignment answer message, the request comprising the wildcard public identity, wherein the wildcard public identity comprises a group of user identities which are registered together and share the service profile; and
completing restoration of the apparatus using the information associated with the service profile received from the home subscriber server in response to the request.

13. A method according to claim 12, the information associated with the service profile received from the home subscriber server being associated with a service profile comprising a first service profile associated with the distinct public identity and a second service profile associated with the wildcard public identity, the first and second service profiles being different.

14. A method according to claim 12, comprising using the wildcard public identity to determine the restoration type by determining whether the restoration comprises an originating restoration or a terminating restoration.

15. A method according to claim 14, comprising selecting correct information associated with the service profile to send to an application server, based on the determination of whether the restoration is an originating restoration or a terminating restoration.

16. A method according to claim 12, the method comprising using the information associated with the service profile to obtain a service profile of the user equipment after restoration of the apparatus.

17. The method according to claim 12, wherein the information associated with the service profile received from the home subscriber server is associated with an implicit registration set having a distinct public identity and the wildcard public identity, a value of the distinct public identity falling within a range of values of the wildcard public identity.

18. A method comprising:
sending a server assignment answer message, in response to initiating restoration at a serving call session control function and receiving a server assignment request comprising (i) an entry indicating an error result code and (ii) a server assignment type set to indicate that there is no assignment, the serving call session control function undergoing restoration following a restart of the call session control function and the server assignment answer message comprising a wildcard public identity of a user equipment responsive to the server assignment request comprising the server assignment type set to indicate that there is no assignment, from which a session initiation message originated;
receiving from the serving call session control function a request for information associated with a service profile of the user equipment based on a restoration type, the request comprising the wildcard public identity, wherein the wildcard public identity comprises a group of public user identities which are registered together and share the service profile; and
in response to the request, sending information associated with the service profile to the call session control function.

19. A method according to claim 18, the information associated with the service profile being associated with a service profile comprising a first service profile associated with the distinct public identity and a second service profile associated with the wildcard public identity, the first and second service profiles being different.

20. The method according to claim 18, wherein the information associated with the service profile is associated with an implicit registration set having a distinct public identity and the wildcard public identity, a value of the distinct public identity falling within a range of values of the wildcard public identity.

* * * * *